(12) United States Patent
Weatherby et al.

(10) Patent No.: US 10,900,594 B2
(45) Date of Patent: Jan. 26, 2021

(54) COLLAR ASSEMBLY

(71) Applicant: Haydale Composite Solutions Ltd., Loughborough (GB)

(72) Inventors: Nicholas Leo Weatherby, Nottingham (GB); David Ronald Chambers, Nottingham (GB); James Robert Strange Mortimer, Nottingham (GB); Stuart Ward, Leicestershire (GB)

(73) Assignee: HAYDALE COMPOSITE SOLUTIONS LTD, Loughborough (GB)

( * ) Notice: Subject to any disclaimer, the term of this patent is extended or adjusted under 35 U.S.C. 154(b) by 63 days.

(21) Appl. No.: 15/757,955

(22) PCT Filed: Aug. 24, 2016

(86) PCT No.: PCT/GB2016/052632
§ 371 (c)(1),
(2) Date: Mar. 6, 2018

(87) PCT Pub. No.: WO2017/042535
PCT Pub. Date: Mar. 16, 2017

(65) Prior Publication Data
US 2018/0252337 A1    Sep. 6, 2018

(30) Foreign Application Priority Data
Sep. 7, 2015 (GB) .................................... 1515842.1

(51) Int. Cl.
*F16L 5/10* (2006.01)
*F16L 5/02* (2006.01)
*F16L 41/08* (2006.01)

(52) U.S. Cl.
CPC .... *F16L 5/10* (2013.01); *F16L 5/02* (2013.01); *F16L 41/08* (2013.01)

(58) Field of Classification Search
CPC ................ F16L 5/10; F16L 5/02; F16L 41/08
See application file for complete search history.

(56) References Cited

U.S. PATENT DOCUMENTS

| | | | |
|---|---|---|---|
| 8,991,876 B2* | 3/2015 | Lauer | A61M 39/10 |
| | | | 285/374 |
| 2010/0270792 A1* | 10/2010 | Lauer | A61M 39/10 |
| | | | 285/328 |

FOREIGN PATENT DOCUMENTS

| | | |
|---|---|---|
| EP | 1 512 434 A1 | 3/2005 |
| EP | 1 837 572 A1 | 9/2007 |
| WO | 2008/140399 A1 | 11/2008 |

OTHER PUBLICATIONS

International Search Report (PCT/GB2016/052632); dated Nov. 28, 2016.

* cited by examiner

*Primary Examiner* — Gilbert Y Lee
(74) *Attorney, Agent, or Firm* — Howard & Howard Attorneys PLLC

(57) ABSTRACT

A collar assembly comprising a collar comprising a duct receiving portion, a first seal positioned on an outer surface of the collar and a second seal positioned on an inner surface of the collar, wherein the collar comprises a plurality of collar portions sealingly connectable to one another to form the collar.

21 Claims, 13 Drawing Sheets

COLLAR ASSEMBLY

CROSS-REFERENCE TO RELATED APPLICATIONS

The present application is a U.S. National Stage of International Patent Application No. PCT/GB2016/052632, filed on Aug. 24, 2016, which claims priority to and all the benefits of Great Britain Patent Application Serial No. 1515842.1, filed on Sep. 7, 2015, both disclosures of which are hereby incorporated by reference in their entirety.

This invention relates to a collar assembly adapted to receive a duct, and particularly, but not exclusively to a collar assembly for removeably sealing a gas transmission pipe at an entry or exit of an inspection pit in order to readily allow inspection and repair. The invention also relates to a method of inspecting a duct, particularly a pipe such as a gas transmission pipe, and to a method of removeably installing a collar in a structure, such as a wall.

In this specification the term duct encompasses any channel, tube, canal, pipe or conduit.

It is to be understood that the collar assembly could be used with any type of duct having any diameter roughly within the range 150 mm to 2 m.

Gas transmission pipes tend to be large pipes having a diameter of up to about 2 m. Such pipes are used to transmit gas from a gas source to the end user, which end user may be a domestic end user or a commercial end user.

In order to ensure the integrity of such pipes, it is necessary to inspect the pipes on a regular basis. Typically, the frequency at which such pipes must be inspected will be once every 10 years. However there may be circumstances which mean that inspection is required more or less frequently.

It is known to inspect gas transmission pipes in inspection pits. A known method of allowing inspection of pipes is to cast a wall around a steel former and to seal a pipe within the former. An inspection pit may be formed between two such walls with a length of exposed pipe running through both walls.

A problem with such an arrangement is that it has been found that over time, the seals used to seal the pipe within the former will degrade, often resulting in the gas transmission pipe settling on a lower surface of the wall. This is potentially dangerous as the pipe may be damaged by resting against the wall. In addition, the damage to the seals allows ingress of sand, grit and/or gravel particles into the pit, which may further damage the pipe.

Another problem is that any repairs and repatriation that are required to be made to the pipe currently require the wall around the pipe to be partially removed. The wall may be made from reinforced concrete, and is typically removed through hydro-demolition, and subsequently reformed around a replacement former and seal.

This operation is time consuming and expensive. There is also a level of risk to personnel carrying out the repair.

When it is necessary again to inspect the pipe and to carry out repair/maintenance on the pipe, it will be necessary to again remove the reinforced concrete around the pipe, carry out the inspection/repair, and then rebuild the concrete wall.

According to a first aspect of the present invention there is provided a collar assembly comprising a collar comprising a duct receiving portion, a first seal positioned on an outer surface of the collar and a second seal positioned on the duct receiving portion of the collar, wherein the collar comprises a plurality of collar portions sealingly connectable to one another to form the collar.

The collar assembly according to embodiments of the invention is adapted to removeably seal a duct within a structure such as a wall.

The first seal is adapted to form a seal between the collar and the structure.

In some embodiments of the invention the collar assembly is particularly suitable for allowing a gas transmission pipe to be removeably sealed within a concrete wall forming part of an inspection pit. However, embodiments of the invention may also be used to allow any duct to be removeably sealed within any outer structure.

Because the collar is formed from a plurality of collar portions sealingly connectable to one another to form a collar, it is possible to fit the collar according to aspects of the present invention around a duct, for example a gas transmission pipe, to thereby form a collar around the pipe. This obviates the need to remove a section of the wall in order to form a collar around the duct as is the case in the prior art arrangements.

By means of the present invention therefore it is possible to form a collar around a gas transmission pipe in order to seal the gas transmission pipe within a concrete wall forming part of an inspection pit. When it is required to inspect the pipe and carry out repair/maintenance on the pipe, it is no longer necessary to remove the reinforced concrete around the pipe in order to inspect the portion of the pipe transitioning through the concrete wall, and then to rebuild the concrete wall after inspection/repair. Instead, the collar may be removed to allow visual access to the part of the pipe extending through the concrete wall.

This is in sharp contrast to the known situation where it can take several weeks to remove the reinforced concrete around the pipe in order to inspect the portion of the pipe transitioning through the wall, and then to rebuild the concrete wall after inspection/repair.

In some embodiments, the collar portions together extend entirely around a duct to form the collar.

The first and second seals may comprise any suitable seals, but in some embodiments each of the first and second seals comprises a hydrophilic seal.

A hydrophilic seal will expand on contact with water. Such seals are particularly useful therefore in positioning a pipe within a structure which may be exposed to water. This is because when the pipe is initially installed into a structure such as a concrete wall, the seals will be dry and therefore take up a smaller volume than will be the case once they have absorbed water. This means that the process of inserting the collar assembly into a structure such as a concrete wall is easier than would be the case if the seals were already occupying their maximum volume.

In other embodiments other types of seals may be used, such as link seals.

There may be more than one first seal and more than one second seal.

The seals may be positioned on the collar by any convenient means, and in some embodiments the seals are bonded to the collar.

In many embodiments of the invention the duct will comprise a pipe having a substantially circular cross-section. In such embodiments, the collar portions, when connected to one another will define a circular aperture, and the collar itself may be ring shaped. Other shapes are of course possible. For example the aperture could be substantially rectangular or square shaped, and the outer perimeter of the collar could also be substantially rectangular or square shaped. In some embodiments, the shape of the aperture formed by the collar may have a different shape to the outer perimeter of the collar. For example, the aperture may be substantially circular, and the outer perimeter of the collar may be substantially rectangular or square in cross-section, for example.

In some embodiments of the invention, the outer perimeter of the collar is substantially circular, but has one straight side.

Such embodiments are useful when there may not be sufficient space to have a collar which is fully circular.

There may be any desirable number of collar portions forming the collar, and in some embodiments there are three collar portions, although in other embodiments there may be more or fewer than three collar portions.

By forming the collar from a plurality of components, the fitting of the collar around a duct is facilitated, since the components may be connected together around the duct, rather than being connected together and then fitted onto the duct. In embodiments of the invention for use with gas transmission pipes, it would not be possible to fit the collar around the pipe without removing a section of pipe if the collar were not formed from a plurality of collar portions.

The second seal may be positionable on one or more of the collar portions.

In some embodiments of the invention, the second seal is bonded to one or more collar portions.

In use, the second seal will form a seal between an outer surface of a duct and an inner surface of the collar so that the collar is sealingly connected to the duct in use.

In embodiments of the invention, each collar portion comprises a first end and a second end, each of which ends comprises an end flange. Each end flange is adapted to connect to a corresponding end flange of an adjacent collar portion to thereby connect a first collar portion to a second collar portion.

In some embodiments of the invention two end flanges may abut one another in order to connect to one another. In other embodiments of the invention, a third seal may be positionable between two end flanges to sealingly connect the collar portions to one another.

The third seal may be any convenient seal, and in some embodiments, the third seal is a hydrophilic seal.

The third seal may be bonded to an end flange, or may be held in position when two end flanges are connected to one another.

Adjacent end flanges may be connected to one another by means of bolts which fit through bolt holes formed in the end flanges. The bolts may be fixed to the flanges by means of nuts.

Each collar portion may comprise an outer flange extending along an outer surface of the collar portion, which outer flange comprises attachment means.

The attachment means may be any convenient attachment means, but in some embodiments, the outer flange comprises one or more apertures through which fasteners such as threaded bars, bolts or the like may be positioned.

The attachment means may be used to attach the collar to a structure such as a wall.

In embodiments of the invention the collar has a first end and an opposite end, the first and second ends being axially spaced apart from one another, wherein the collar has an outer wall having a cross-sectional shape that is larger at the first end than at the second end.

In such embodiments the collar tapers from the first end to the opposite end.

In some embodiments of the invention one or more collar portions may comprise a handle.

The handle assists in moving the collar portion around a duct when fitting the collar assembly around the duct.

In embodiments of the invention, the collar assembly comprises a former adapted to receive the collar assembly.

The former may be a substantially cylindrical sleeve. The former may be used to ensure a smoother aperture into which the collar assembly is insertable.

In use, for example when the structure comprises a concrete wall, the former may be used to define a substantially cylindrical tunnel through which the duct can extend, and into which the collar assembly is positionable.

When the former comprises a substantially cylindrical sleeve, it may define a substantially cylindrical space in which the collar may be insertable.

The former may be formed from a plurality of former portions. The former portions may be sealingly connectable to one another.

There may be any desirable number of former portions, and in some embodiments there are three former portions although in other embodiments there may be more or fewer former portions.

By making the former out of a plurality of former portions, construction of the former is facilitated.

In embodiments of the invention where the collar is tapered, the former may also be tapered. Alternatively, the former may have a substantially uniform shape along its length even when the collar is tapered from a first end to an opposite end. In other embodiments, the former may taper from one end to an opposite end, and the collar may have a substantially uniform shape along its length.

One or more of the former portions may comprise a lifting eye. The presence of a lifting eye facilitates lifting of the former portions into position within the outer component.

The former may comprise a water bar. In some embodiments of the invention the water bar comprises a ridge extending around the circumference of the former. This ridge creates a torturous route to prevent or reduce water ingress between the former and wall during use of the collar assembly. In embodiments of the invention where the collar assembly is adapted to fit around a gas transmission pipe and to removeably seal the gas transmission pipe in a wall of an inspection pit, the water bar prevents or reduces the amount of water able to enter the inspection pit.

The collar assembly may comprise a blanking plate. The blanking plate is adapted to attach to the structure in which the duct is to be removeably sealed. In embodiments of the invention, the blanking plate is adapted to attach on the opposite side of the wall to the outer flange of the former.

In embodiments of the invention the blanking plate comprises a plurality of injection and vent ports. This arrangement facilitates pumping of flowable concrete/grout into the space between the former and the structure in order to set the former into the structure.

In embodiments of the invention, the structure may comprise a concrete wall.

The collar assembly may comprise a blanking panel. The blanking panel is adapted to engage with the former, and is adapted to blank off the space created by the collar between the former and the duct. This is particularly useful in embodiments of the invention adapted to removeably seal a gas transmission pipe in a wall of an inspection pit, as the blanking panel is able to reduce or mitigate ingress of pipe surround material into the inspection pit.

The blanking panel may comprise a plurality of blanking panel portions.

Embodiments of the invention are particularly suitable for use in removeably sealing a gas transmission pipes at the entrance and/or exit of a concrete inspection pit to allow easy inspection and repair. In such embodiments of the invention the collar assembly comprises a composite gas transition piece (GTP).

In embodiments of the invention, the first, second and third seals each comprise hydrophilic seals. A hydrophilic seal is made from a highly water absorbent (hydrophilic) compound of rubber that expands as it comes into contact with water. When such seals are used, the seal will remain effective and will not shrink as long as water is present.

Various types of hydrophilic seals are available in a range of sizes, cross-sections and swelling ratios.

Other, non-hydrophilic seals may also be used. Such seals may be useful to form a seal between two mating surfaces of the collar assembly where compression between the two mating surfaces can be readily applied.

Link seals may also be used. Link seals are modular, mechanical seals, consisting of rubber links with a system of bolts and pressure plates allowing the seal to be compressed axially, causing it to expand to fill an annulus base around the pipe. A range of material types are available for different applications including EPDM, Silicone and Nitrile rubbers.

Collar assemblies according to embodiments of the invention are adapted to support approximately 5 metre length of pipe having a 900 mm (or 36 inches) nominal diameter.

The collar assembly according to embodiments of the invention is adapted to accommodate an axial displacement of approximately +/−25 mm of the pipe.

By means of embodiments of the present invention it may be possible to remove and reinstall the collar assembly according to embodiments of the invention within one day using a two man team.

According to a second aspect of the present invention there is provided a method of installing and removeably sealing a duct in a structure using a collar assembly comprising a collar adapted to receive the duct therewithin, a first seal positioned on an outer surface of the collar, and a second seal positioned on an inner surface of the collar, wherein the collar comprises a plurality of collar portions sealingly connectable to one another to form a collar, the method comprising the steps of:
   creating an aperture in the structure;
   placing the collar around the duct by placing the collar portions around the duct;
   inserting the collar into the structure;
   attaching the collar to the structure.

In embodiments of the invention the duct comprises a gas transmission pipe, and the structure comprises a concrete wall such as a reinforced concrete wall. The concrete wall may form part of an inspection pit for inspecting the pipe passing through the concrete wall.

The method may comprise the additional step of connecting the collar portions together prior to inserting the collar into the structure.

The step of creating an aperture may make use of any desirable process, and make for example comprise the step of creating the aperture using hydrodemolition, for example. Alternative methods of forming the aperture could include use of a chainsaw, or wire cutting, for example.

The aperture may have any convenient dimensions, and in some embodiments of the invention the dimensions of the aperture approximately 2100 mm for a 900 mm (36 inch) diameter pipe.

The clearance between the concrete wall and the pipe created by having an aperture of these dimensions allows for inspection of the pipe without the need for subsequent demolition of the wall.

In embodiments of the invention in which the collar assembly comprises a former adapted to receive the collar, the method may comprise the additional step of placing the former around the collar portions prior to inserting the collar into the structure; and then
   inserting the collar assembly into the structure.

In embodiments of the invention in which the collar assembly comprises a former, the method may comprise the further step of attaching the collar portions to the former. This step may replace the step of connecting the collar portions together.

In such embodiments of the invention the method may comprise the further step of attaching the former to the structure.

According to a third aspect of the present invention there is provided a method of inspecting a duct fitted with a collar assembly according to embodiments of the first aspect of the invention, the method comprising the steps of:
   releasing the collar from the structure; and
   removing the collar from the structure to expose a section of the duct within the structure.

In embodiments of the invention comprising a former, the method comprises the further step of releasing the former from the outer component and then removing the collar to expose the duct.

The method comprises the further step of reinstalling the collar after inspection of the pipe.

Figure 1:
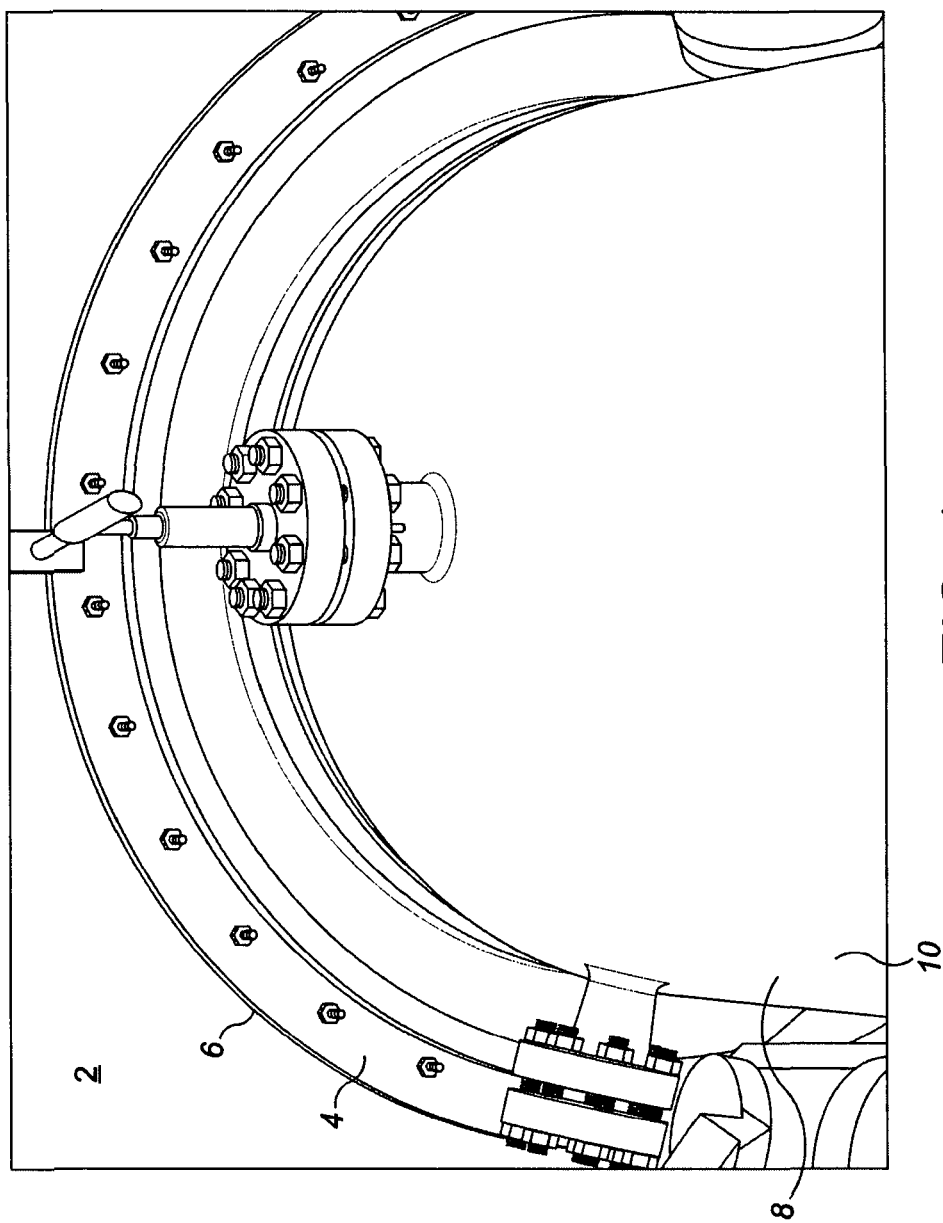
FIG. 1 shows an existing method of sealing a gas transmission pipe at an entry/exit inspection pit.
Figure 2:
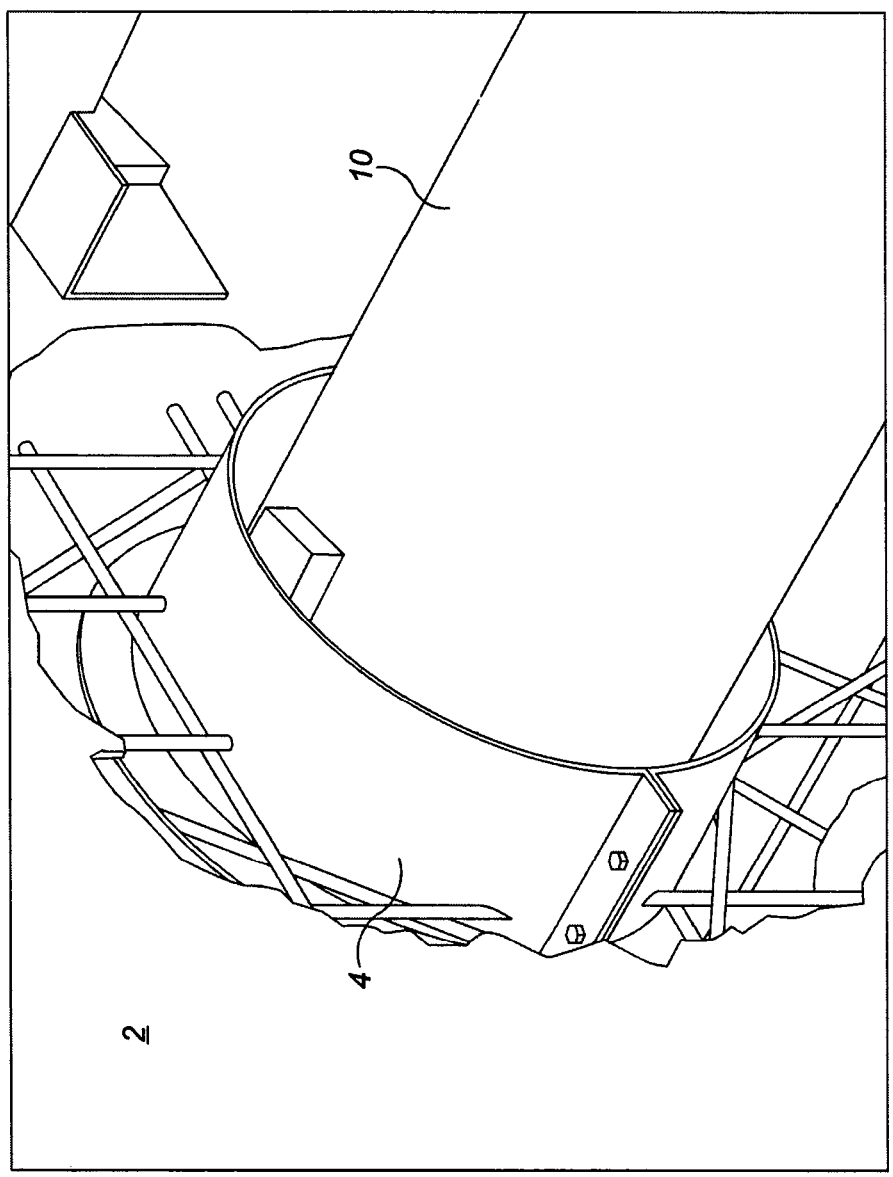
FIG. 2 shows a concrete wall having been demolished to allow access to the pipe.
Figure 3:
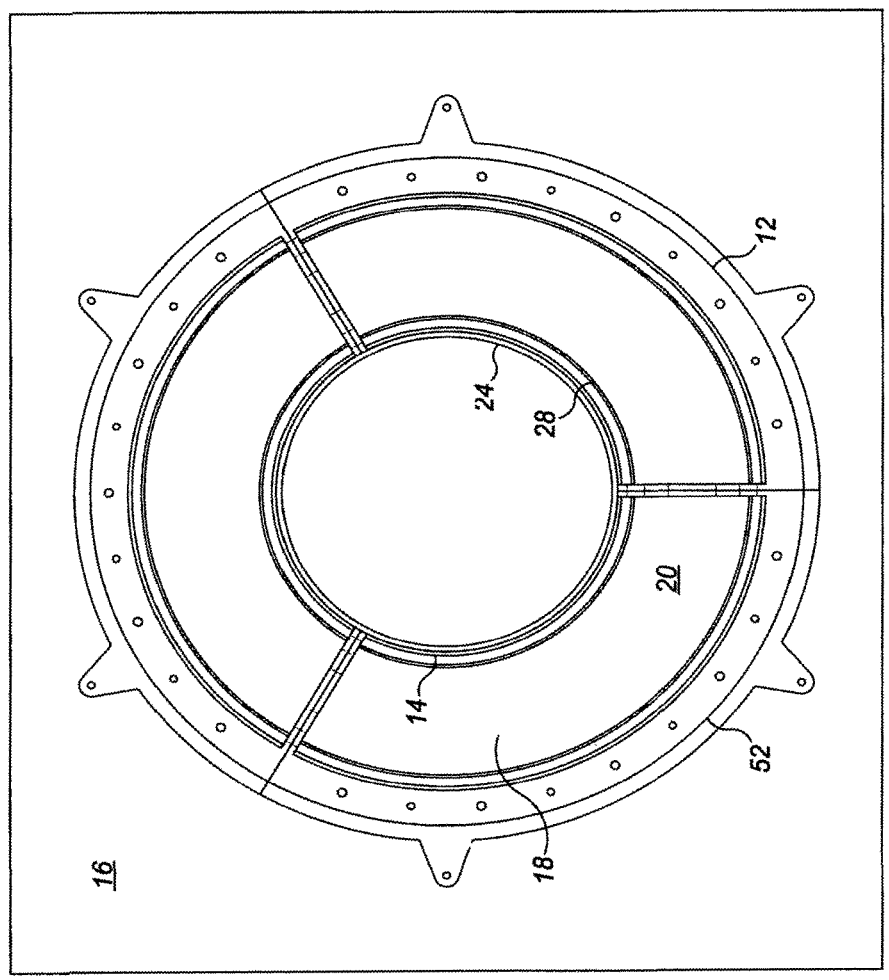
FIG. 3 is a schematic representation of a collar assembly according to an embodiment of the invention.
Figure 4:
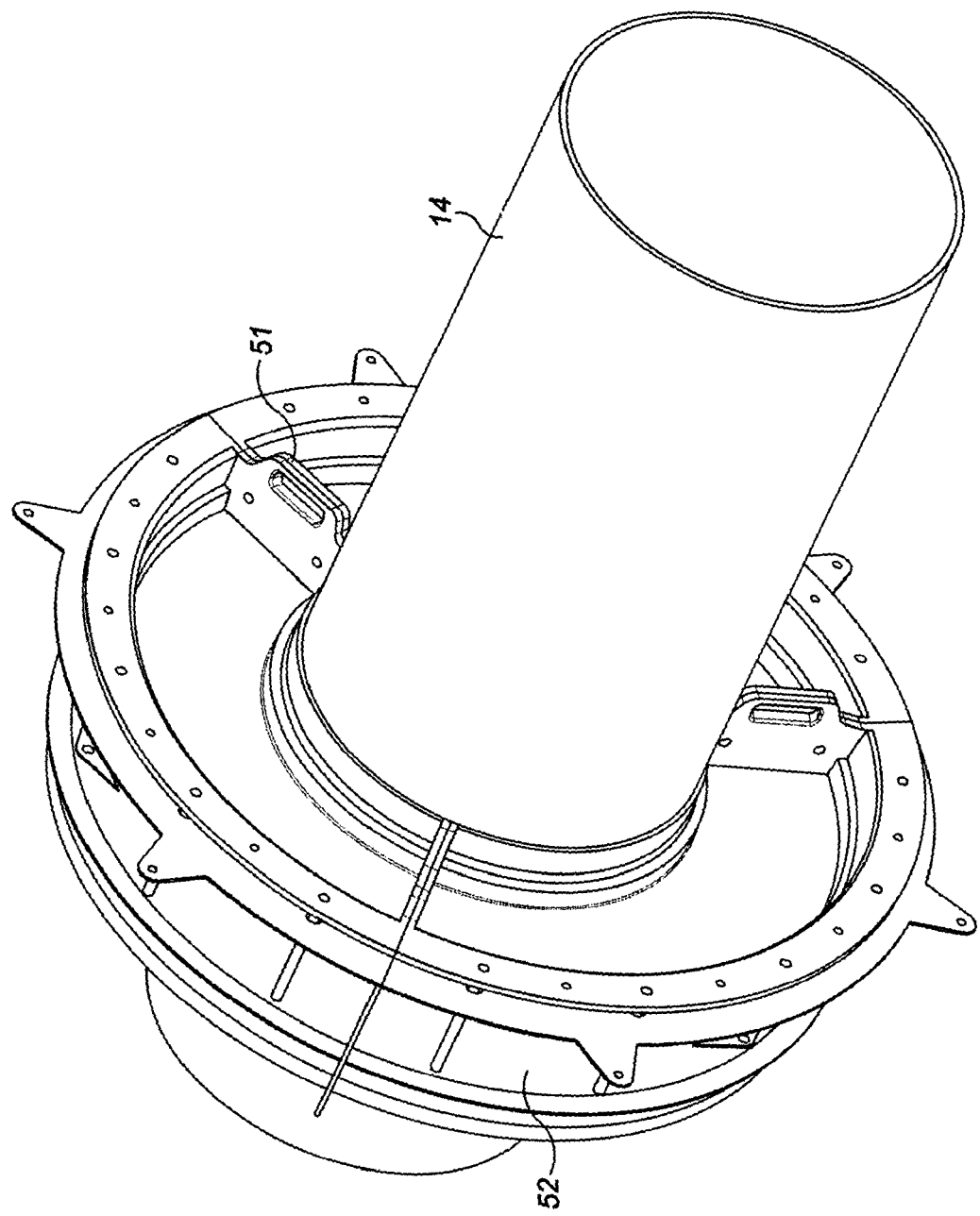
FIG. 4 is a schematic representation of a collar assembly according to an embodiment of the invention shown with a pipe extending therethrough.
Figure 5:
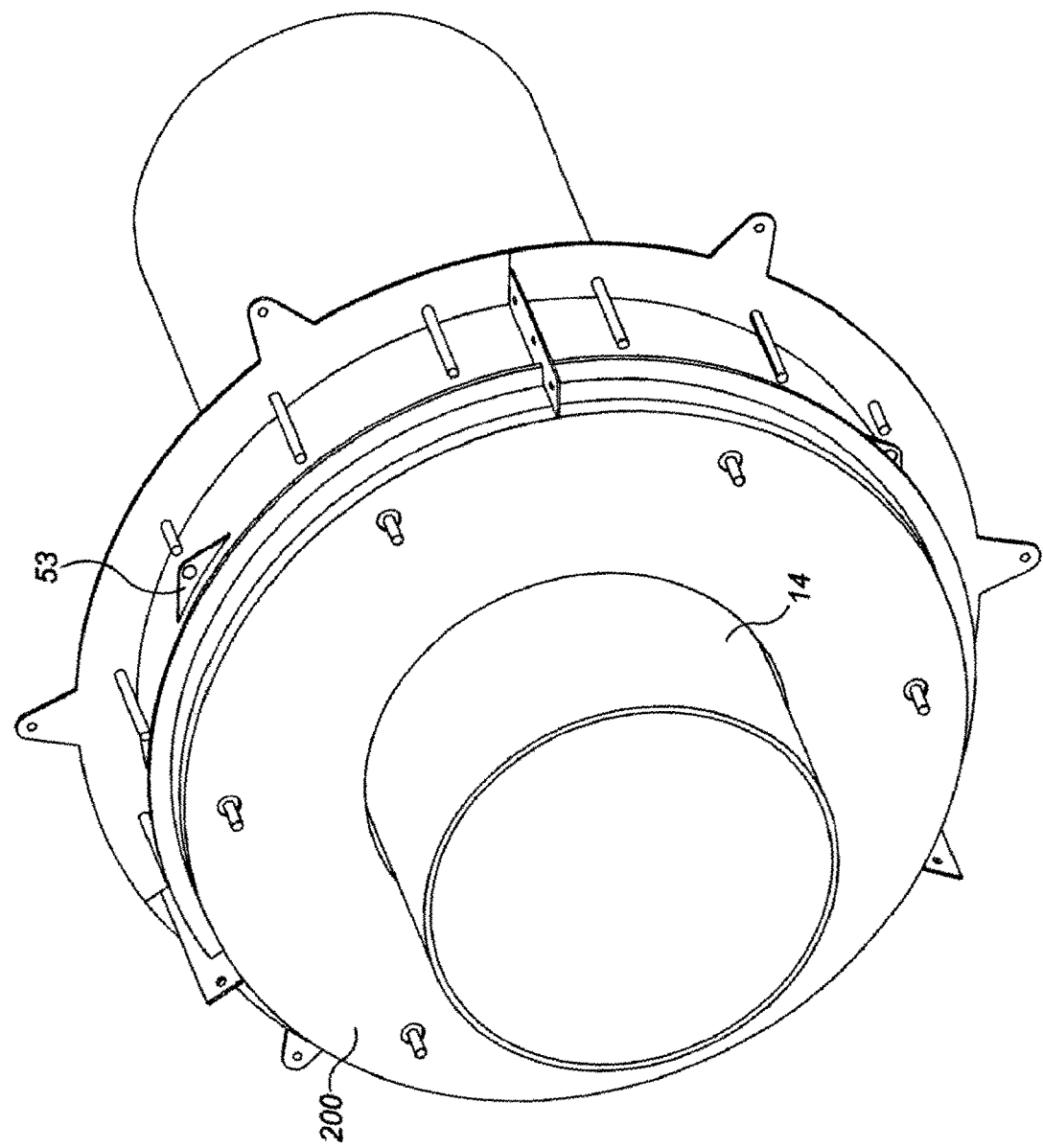
FIG. 5 is a schematic representation showing the collar assembly of FIG. 4 showing a blanking panel.
Figure 6:
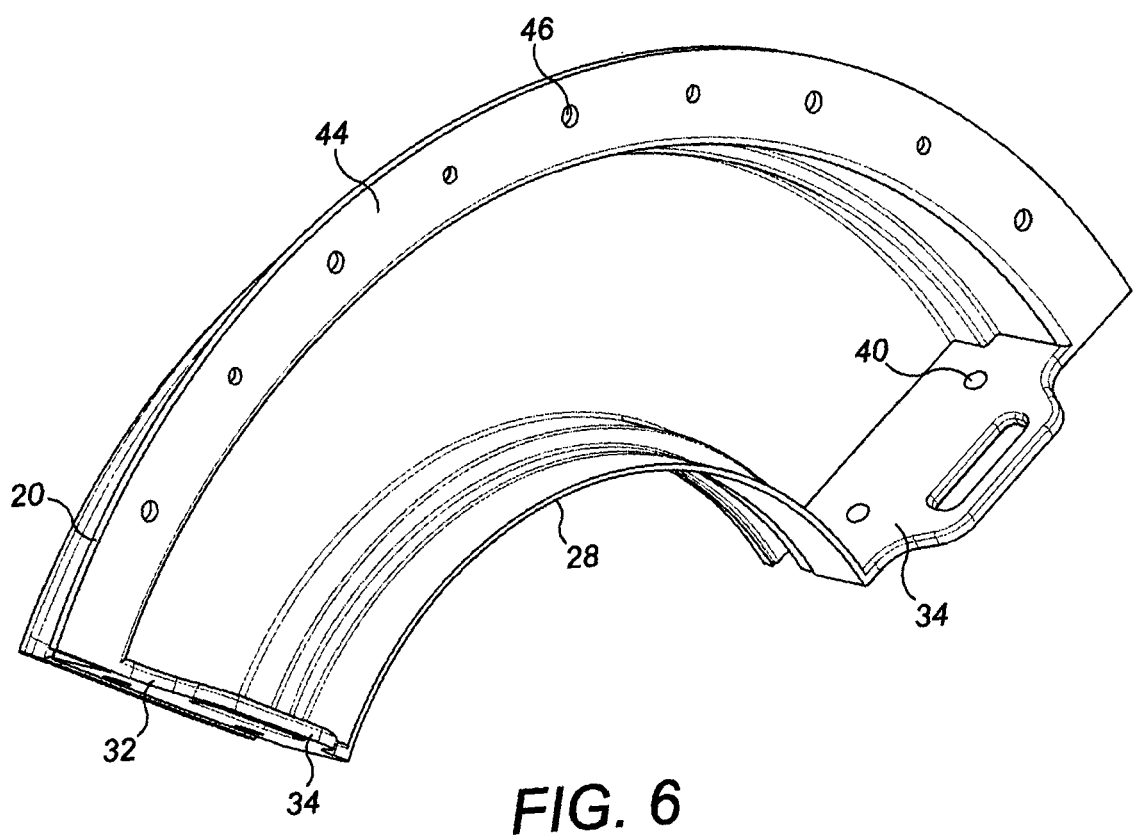
FIGS. 6 and 7 are schematic representations of a collar portion forming part of the collar assembly shown in FIG. 3.
Figure 7:
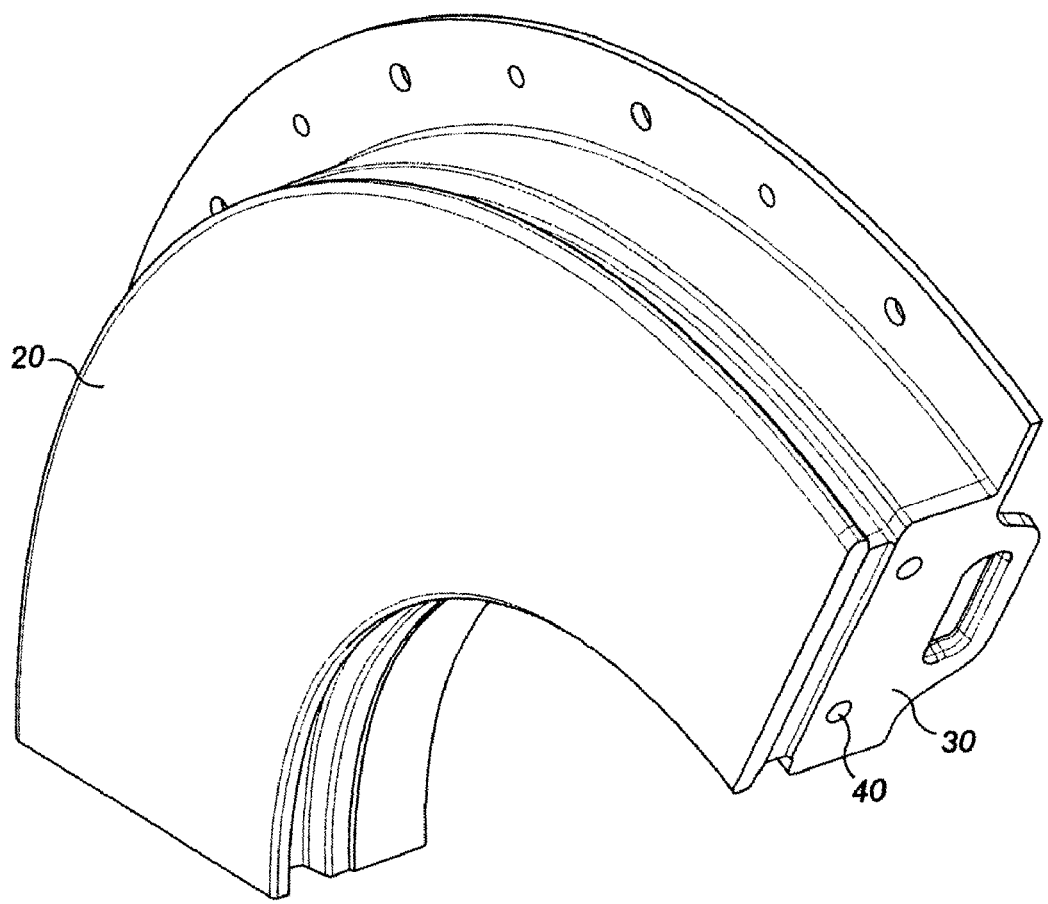
Figure 8:
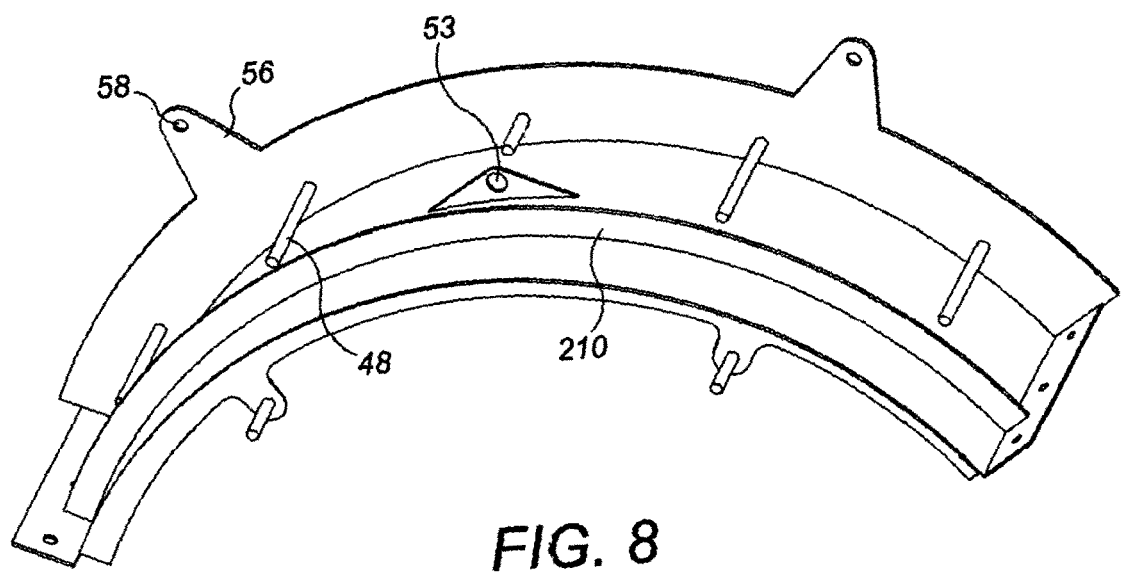
FIGS. 8 and 9 are schematic representations of a former portion forming part of the former shown in FIG. 3.
Figure 9:
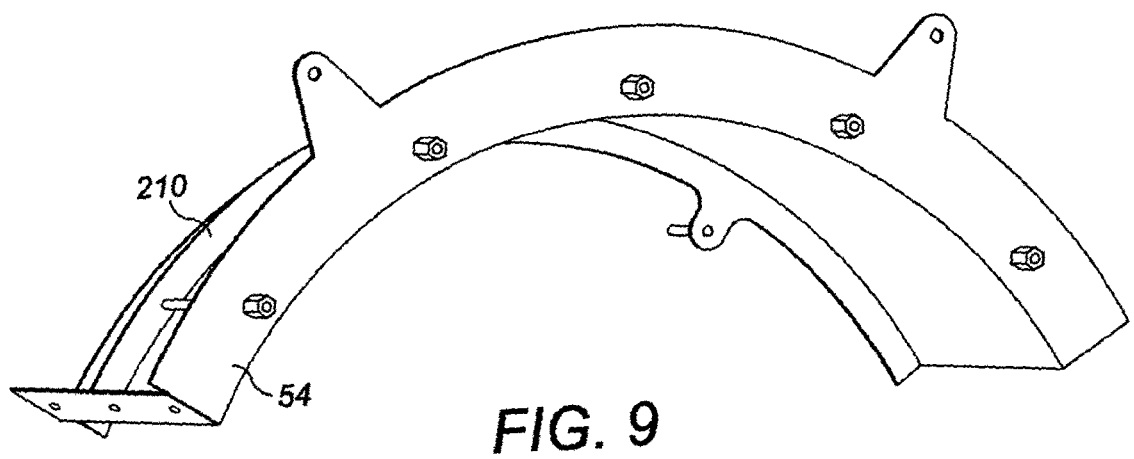

Referring initially to FIGS. 1 and 2 a known method for inspecting gas transmission pipes will be described.

A current known method is to cast a concrete wall 2 around a steel former 4, which in turn clamps against a rubberised compression seal 6 which makes contact with an outer surface 8 of a pipe 10. Over time it has been found that the seals will degrade, often resulting in the gas pipe 10 settling on the lower surface of the concrete wall with potential damage to the pipe.

A disadvantage of the known method is that due to the lack of visual access, an inspection is then required with any necessary repair work performed accordingly.

The inspection process currently requires the reinforced concrete around the pipe to be removed as shown for example in FIG. 2. The removal process is currently achieved using hydro-demolition processes. After inspection, the concrete wall must be reformed around a replacement former and seal.

This operation is time consuming and has an inherent level of risk associated with it.

The invention will now be described with reference to FIGS. 3 to 14.

A collar assembly according to an embodiment of the invention is designated generally by the reference numeral 12. The collar assembly is adapted to removeably support a pipe 14 within component structure 16 which in this embodiment comprises a concrete wall.

The collar assembly comprises a collar 18 formed from a plurality of collar portions 20. In this embodiment there are three collar portions 20, although in other embodiments there could be more or fewer collar portions.

Together, the collar portions 20 extend entirely around the pipe that is to be fitted with the collar assembly.

In this embodiment, the cross-sectional shape of the pipe is generally circular, and the collar portions 20 when connected to one another define a substantially circular aperture 26. The collar itself is ring shaped in this embodiment. Other shapes are of course possible.

Each collar portion 20 comprises a duct receiving portion 28 onto which a second seal 24 may be positioned.

Each collar portion comprises a first end 30 and a second end 32. In this embodiment of the invention each of the first and second ends 30, 32 comprises an end flange 34.

Each end flange is adapted to abut against a corresponding end flange in an adjacent collar portion 20 in order to connect adjacent collar portions to one another. In this embodiment, the collar 18 comprises a third seal which is positioned between two end flanges such that when the end flanges connect to one another, the seal is positioned therebetween in order to form a sealed connection between the two end flanges.

Adjacent end flanges 34 may be connected to one another by means of bolts which fit through bolt holes 40. The bolts may be tightened in any known manner for example by the use of nuts. Other fastening methods could be used.

Each collar portion comprises an outer flange 44 extending along an outer surface of the collar portion 20.

The collar 18 comprises attachment means for enabling attachment of the collar to the structure 16. In this embodiment the attachment means comprise apertures 46 through which bolts are positionable in order to secure the collar 18 in position in the concrete wall 16. One of more of the collar portions 20 may comprise a handle 51 for facilitating lifting and positioning the collar portion 20 during use.

In some embodiments of the invention, the collar 18 may be inserted directly into an outer component such as the concrete wall 16. However, in this embodiment, the collar assembly 12 further comprises a former 52 which in this example is formed from steel. The former 52 is formed from former portions 54, and in this embodiment there are three former portions 54.

The former is shaped to define an aperture in the concrete wall 16, and is engageable with the collar 18 such that in use, the collar 18 will be sealingly connected to the former 52, rather than directly to the concrete wall 16.

Each former portion 54 comprises a former flange 56 extending around an outer surface of the former 52. In this embodiment, threaded rods are formed in, and extend from the former flange 56. These are designed to provide improved seating between the re-set concrete wall and the former.

One or more former portions 54 may further comprise a lifting eye 53. The lifting eye assists in moving a former portion 54 into position during installation and removal of the collar assembly.

The former may also comprise a water bar 210. The water bar in this embodiment comprises a ridge extending around the circumference of the former 52. This ridge creates a tortuous route to prevent water ingress through the collar assembly 12.

The former flange 54 comprises attachment lugs 56 with bolt holes 58 through which the bolts are insertable into the wall. Thus in this embodiment of the invention, the former will be fixed to the concrete wall 16 by means of bolts that extend through bolt holes in the former portions 54, and the threaded rods 48.

Figure 12:
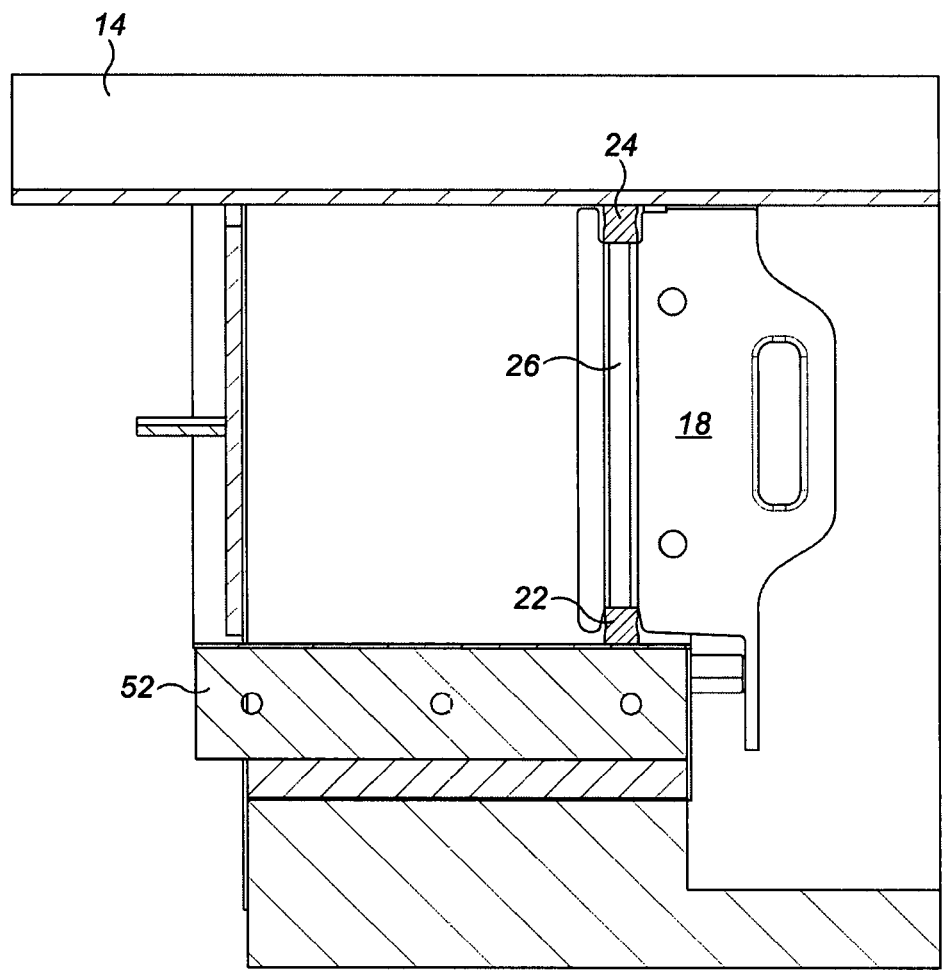
FIG. 12 is an enlarged cross-sectional view of the lower portion of the collar assembly of FIG. 3.

The first, second and third seals forming part of a collar assembly according to embodiments of the invention are shown particularly FIG. 12. As can be seen from these figures, a first seal 22 is positioned on an outer surface of each collar portion, and serves to provide a seal between the collar 18 and the former 52.

A second seal 24 is positioned on an inner surface of each collar portion and serves to provide a seal between the pipe 14 and the collar 18 during use of the collar assembly 12.

A third seal 26 is positioned between adjacent end flanges 34.

Figure 10:
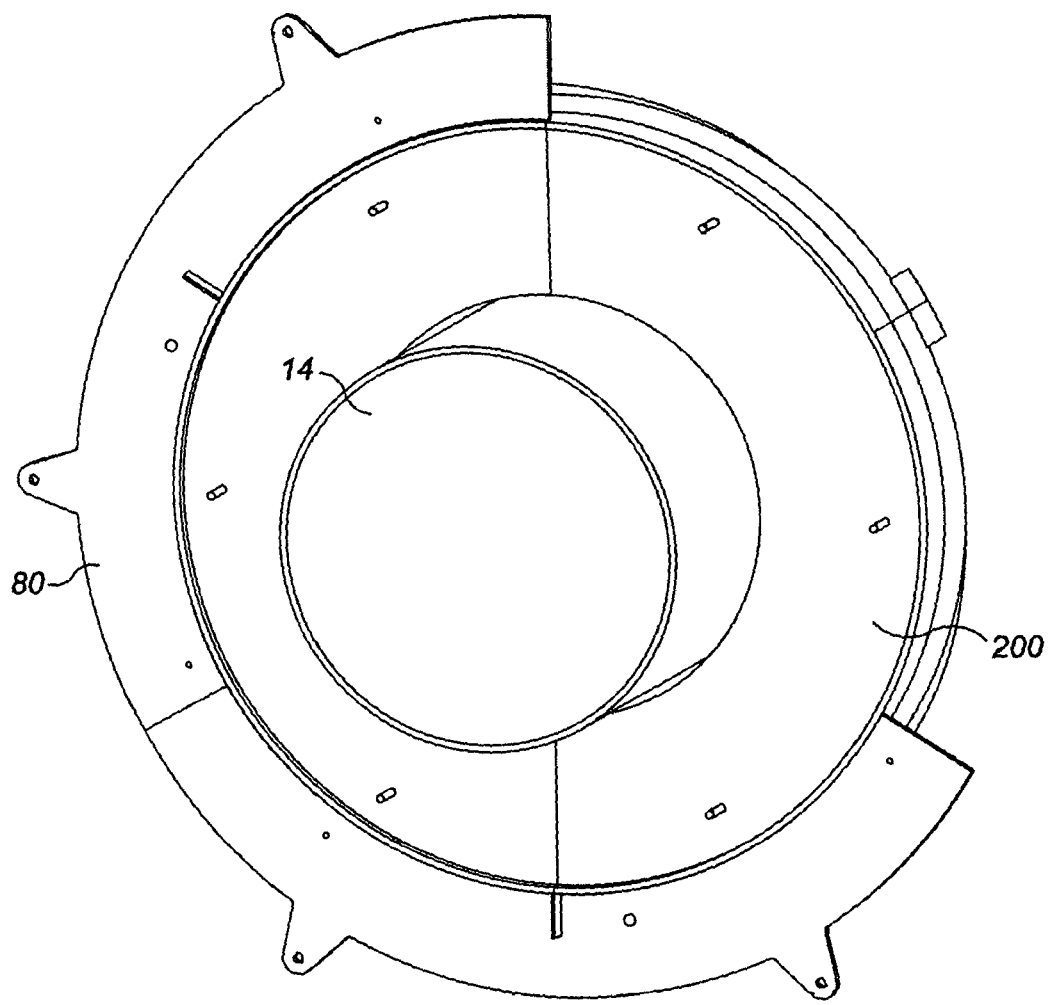
FIG. 10 is schematic representation of the collar assembly of FIG. 3 showing the blanking panel and blanking plate.
Figure 11:
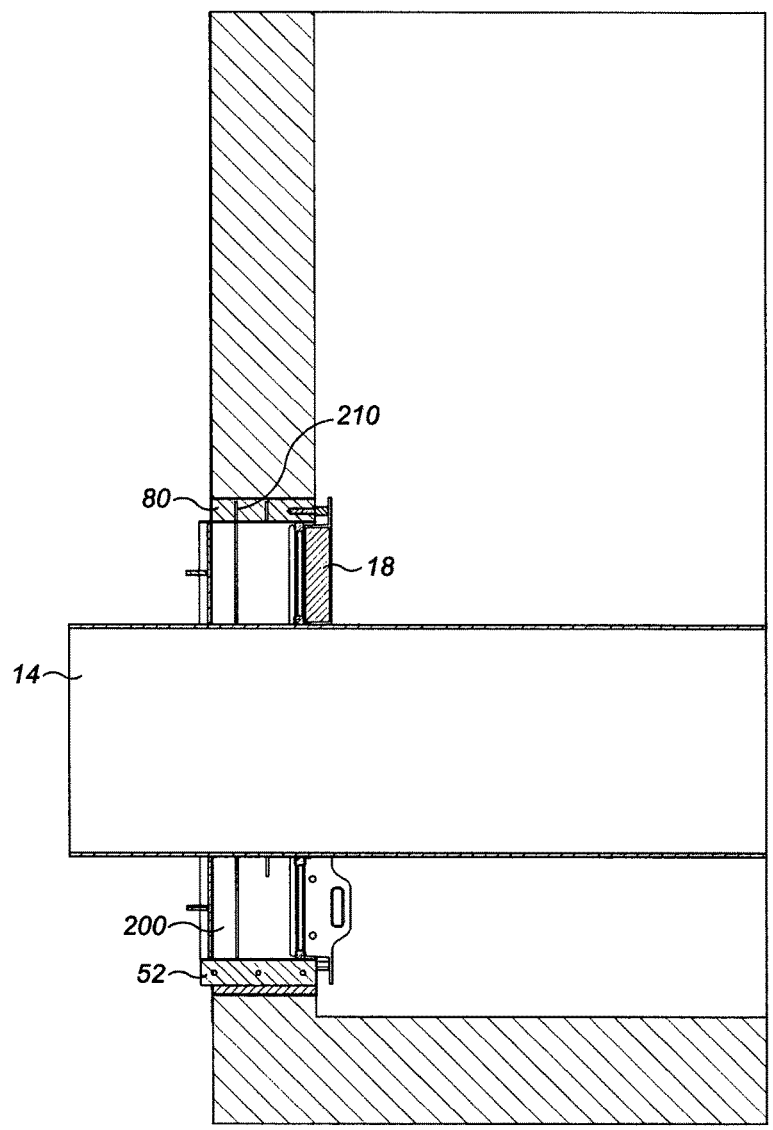
FIG. 11 is a cross-sectional representation of the collar assembly of FIG. 3.

The collar assembly may also comprise a blanking plate 80 shown for example in FIG. 10. The blanking plate 80 is engageable with the former 52.

A blanking plate can be advantageous since it can prevent flow of pipe surround material into the inspection pit.

The collar assembly also comprises a blanking panel 200 which is attachable to the former 52 and serves to cover the space between the pipe 14 and the former 52 created by the presence of the collar.

A method of installing a collar assembly according to embodiments of the invention will now be described.

Initially, an aperture must be formed within a structure, which in this case is a reinforced concrete wall 16 through which a gas transmission pipe 14 runs.

Hydro-demolition may be used to form the aperture.

Figure 13:
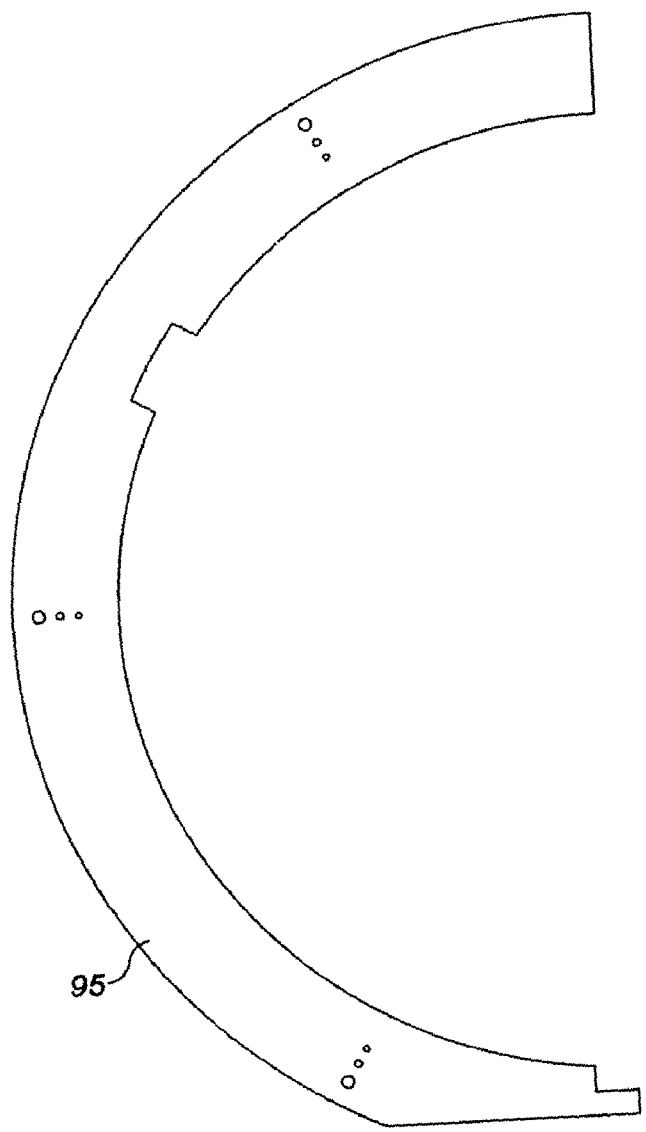
FIG. 13 is a schematic representation of one half of a hydro demolition template formed from two parts that may be used when installing a collar assembly as shown in FIG. 3.

It can also be useful to use a hydro-demolition template 95 made from a material such as steel which is unaffected by the hydro demolition process such as the one shown partially in FIG. 13 to assist in formation of the aperture. The template 95 may be secured to a face of the concrete wall 16 by any convenient means such as by the use of anchor bolts.

The template 95 is positioned concentrically around the pipe whilst holes are drilled in order to secure the template to the face of the wall 16.

Figure 14:
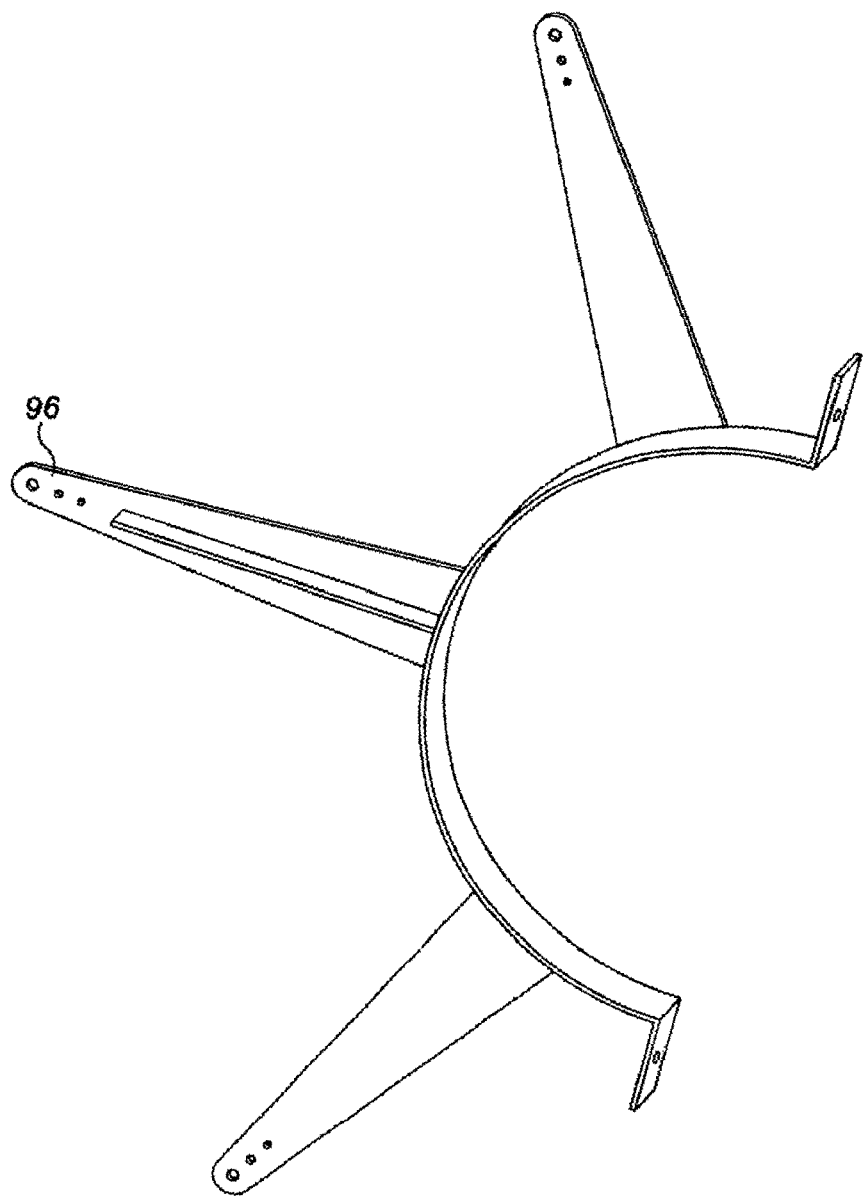
FIG. 14 is schematic representation of one half of a jig formed from two parts that may be used with the template of FIG. 3.

In some embodiments, a jig 96 as shown partially in FIG. 14 may be used to ensure concentricity of the pipe and hydro demolition template. This jig may be removed before the hydro demolition is carried out, leaving the hydro demolition template attached to the wall.

Use of a template enables tighter aperture tolerances to be achieved which in turn means a smaller former flange 56 may be used, allowing more ground clearance of the collar assembly.

Once the aperture has been created, first and second former portions 54 may be lowered into the inspection pit and placed within the aperture formed in the concrete wall and underneath the pipe. It may sometimes be necessary to carry out further drilling and grinding of the reinforced concrete in order to widen the hole so that the former flanges 56 fit within the hole.

Two collar portions 20 are then lowered into the pit and bolted together around the pipe.

A third, upper collar portion 20 is then lowered down onto the pipe and bolted to the other two collar portions 20.

Another former section may then be lowered onto the collar 18 and secured to the collar. The lifting eye on the former portion facilitates this part of the procedure.

The first seal 22 may be lubricated using, for example washing up liquid or any other suitable lubricant prior to positioning the former portion.

Mastic may be applied to the flanges to prevent water ingress into the pit.

The former sections may then be bolted together.

The collar and former assembly may then be pushed into the wall 16 whilst the orientation of the components is checked. More drilling and grinding may be required in order to allow clearance for all the threaded rods and the flanges of the former.

The former may then be bolted in position within the concrete wall using the bolts.

The blanking plate 80 may then be fitted to the former on the outside of the wall, facilitating the filling of the space around the former, within the wall, with a flowable concrete or grout.

Any remaining space around the former may then be backfilled with a suitable flowable concrete or grout.

The blanking panel 200 may then be positioned around the pipe on the outside of the concrete wall in order to cover the hole to prevent wet sand from entering the pit when the collar is removed. This may fit onto studs on the former, and be attached to the former.

When it is again required to remove the collar assembly 12 in order to inspect the pipe, the following steps may be carried out.

Initially, both the inspection pit, and surrounding earth are de-watered.

The pipe is then thoroughly lubricated in order to allow the collar to slide more easily.

Once the collar is clear of the former the bolts holding the former sections together may be removed and the three collar portions removed from the inspection pit. Movement of the collar portions is facilitated by means of the handles.

The collar may be removed to give more access to pipe.

The pipe is exposed and inspection may take place. After inspection, the collar and former must be reinstalled.

In this respect, the pipe is initially lubricated in order to allow the collar assembly to slide along the pipe.

The three collar portions are then positioned around the pipe and bolted together.

The collar is then caused to slide along the pipe until the collar is inside the former, and can be re-attached to the former.

The invention claimed is:

1. A collar assembly for removably sealing a duct within a structure, the collar assembly comprising a collar formed from a plurality of collar portions sealingly connectable to one another around a duct receiving portion, a first seal positioned on an outer surface of the collar to form a seal between the collar and the structure, and a second seal positioned on an inner surface of the collar to form a seal between an outer surface of the duct and an inner surface of the collar, the first and second seals each comprising hydrophilic seals.

2. A collar assembly according to claim 1 wherein the collar portions together extend entirely around a duct.

3. A collar assembly according to claim 1 in which the collar portions together define a substantially circular aperture, and the collar is substantially ring shaped.

4. A collar assembly according to claim 1 wherein the outer perimeter of the collar is substantially rectangular, or square shaped.

5. A collar assembly according to claim 1 wherein the outer perimeter of the collar is substantially circular but has a substantially straight side.

6. A collar assembly according to claim 1 wherein each collar portion comprises a first end and a second end, each of which ends comprises an end flange, wherein each end flange is adapted to abut against a corresponding end flange of an adjacent collar portion, to thereby connect a first collar portion to a second collar portion.

7. A collar assembly according to claim 1 wherein each collar portion comprises an outer flange extending along an outer surface of the collar portion.

8. A collar assembly according to claim 1 wherein the collar has a first end and a second end, the first and second ends being axially spaced apart from one another, wherein the collar end has an outer wall having a cross sectional shape that is larger at the first end than at the second end.

9. A collar assembly according to claim 1 wherein one or more of the collar portions comprises a handle.

10. A collar assembly according to claim 1 further comprising a former adapted to receive the collar assembly.

11. A collar assembly according to claim 10 wherein the former comprises a plurality of former portions, which former portions are sealingly connectable to one another.

12. A collar assembly according to claim 10 wherein the former comprises a lifting eye.

13. A collar assembly according to claim 10 wherein the former comprises a water bar.

14. A collar assembly according to claim 10 further comprising a blanking plate adapted to engage with the former.

15. A collar assembly according to claim 1 further comprising a blanking panel.

16. A method of installing and removeably sealing a duct in a structure using a collar assembly, the collar assembly comprising a collar adapted to receive the duct therewithin, a first seal positioned on an outer surface of the collar to form a seal between the collar and the structure, and a second seal positioned on an inner surface of the collar to form a seal between an outer surface of the duct and an inner surface of the collar, wherein the collar comprises a plurality of collar portions sealingly connectable to one another to form a collar; the method comprising the steps of, and wherein the first and second seals each comprise hydrophilic seals:

creating an aperture in the structure;
placing the collar around the duct by placing the collar portions around the duct;
inserting the collar into the structure;
attaching the collar to the structure.

17. A method according to claim 16 wherein the step of creating an aperture is carried out by hydro demolition.

18. A method according to claim 16 wherein the collar assembly comprises a former adapted to receive the collar, and the method comprises the further step of placing the former around the collar portions prior to inserting the collar into the structure, and then inserting the collar assembly into the structure.

19. A method according to claim 18 comprising the further step of attaching the former to the structure.

20. A method of inspecting a duct fitted with a collar assembly according to claim 1, the method comprising the steps of:
   releasing the collar from the structure; and
   removing the collar from the structure to expose a section of the duct within the structure.

21. A method according to claim 20 comprising the further step of releasing the former from the outer component and then removing the collar from the structure to expose the duct.

\* \* \* \* \*